United States Patent [19]

Lee

[11] Patent Number: 5,579,058
[45] Date of Patent: Nov. 26, 1996

[54] MOTION DETECTION CIRCUIT AND METHOD USING SPATIAL INFORMATION

[75] Inventor: Myeong-hwan Lee, Suwon, Rep. of Korea

[73] Assignee: Samsung Electronics Co., Ltd., Kyungki-do, Rep. of Korea

[21] Appl. No.: 348,904

[22] Filed: Nov. 25, 1994

[30] Foreign Application Priority Data

Nov. 24, 1993 [KR] Rep. of Korea ............... 93-25126

[51] Int. Cl.⁶ .................................................. H04N 5/14
[52] U.S. Cl. .................................... 348/699; 348/700
[58] Field of Search ............................... 348/699, 700, 348/701, 616, 617

[56] References Cited

U.S. PATENT DOCUMENTS 4,464,789  8/1984  Sternberg ........................... 348/700
5,153,719  10/1992  Ibenthal ........................... 348/700

Primary Examiner—Tommy P. Chin
Assistant Examiner—A. Au
Attorney, Agent, or Firm—Sughrue, Mion, Zinn, Macpeak & Seas

[57] ABSTRACT

A motion detection circuit and method using spatial information obtains spatial correlation information in various directions of a frame and compares the spatial correlation information with a value corresponding to a previous frame to thereby effectively use a frame memory to accurately detect motion. The motion detection circuit uses a number of line memories and delays to delay an input signal and transform the delayed signal into samples necessary for extracting spatial correlation information. Subsequently, the motion detection circuit obtains a subtraction value of the sample, compares the subtraction value with a reference value, and extracts spatial correlation information. Also, the motion detection circuit uses a comparator to compare proper bit spatial correlation information with a pixel value corresponding to a previous frame stored in a frame memory and to determine whether the input signal is in a moving area or a stationary area.

26 Claims, 5 Drawing Sheets

MOTION DETECTION CIRCUIT AND METHOD USING SPATIAL INFORMATION

BACKGROUND OF THE INVENTION

The present invention relates to motion detection technology for processing a video signal. More particularly the present invention relates to a motion detection circuit and a method in which the spatial information of a video signal is represented by more than one bit. Furthermore, the present invention calculates spatial information in a plurality of directions to accurately detect motion and efficiently uses a frame memory.

Generally, in video signal processing equipment (such as a high definition television, a video tape recorder, and a camera) motion detection is used for encoding a video signal. To encode the signal, an adjacent interframe difference signal is encoded to compress motion image data. Also, in order to improve picture quality, the picture is divided into frame blocks of a predetermined size, an adjacent interframe motion is found, the picture is shifted by the moved distance, and an interframe motion is reduced. In the above steps, finding the interframe motion per frame block is called "motion estimation," and the distance moved is called a "motion vector." Also, using the frame block of a previous frame to compensate for the movement of the currently processed frame block is called "motion compensation." The previous frame corresponds to the frame which is adjacent to the current frame block and was processed immediately before the current frame block is processed.

A conventional and basic motion detection circuit uses a frame memory to obtain interframe difference signals between frames. In addition, the motion detection circuit determines whether the video signal is in a motion area or a stationary area by comparing the interframe difference signal with a predetermined reference value.

However, since such a conventional motion detection circuit requires a frame memory, the cost of a conventional motion detection circuit is relatively high. Thus, a conventional motion detection circuit has not been used in typical video equipment except for an improved definition TV or an enhanced definition TV.

Also, most video equipment process a video signal in a spatial domain (i.e a horizontal-vertical two-dimensional domain). However, still area processing is advantageous for processing a signal using a frame memory, while motion area processing is advantageous for processing a signal in time domain. Thus, it is not efficient to process a signal in only a spatial domain. In order to effectively solve such a problem, it is necessary to simplify the hardware and lower the costs of the motion detection circuit.

Figure 1:
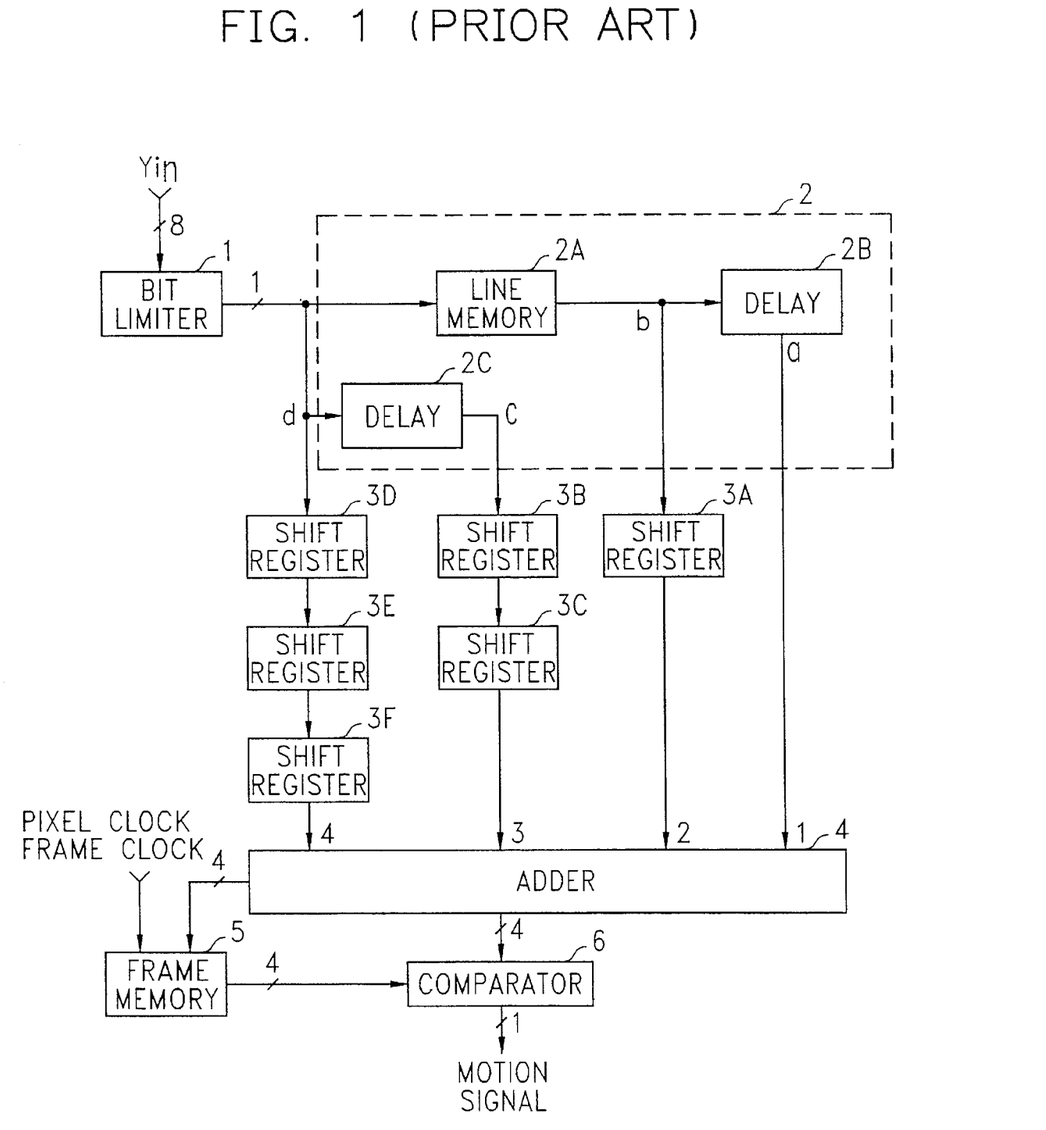
FIG. 1 is a conventional 1-bit motion detection circuit diagram.

FIG. 1 is a circuit diagram of a conventional one-bit motion detection circuit which attempts to solve some of the above-described problems. As shown in FIG. 1, the conventional motion detection circuit includes a bit limiter 1 which compares an 8-bit input video signal $Y_{in}$ with a predetermined reference value and converts the input video signal $Y_{in}$ into a 1-bit signal according to the result of the comparison. A memory portion 2 is connected to the bit limiter 1 and includes a line memory 2A for storing the multiple outputs of the bit limiter 1 which form an entire row of pixels. The memory portion also includes a delay 2B for delaying the output of the line memory 2A for one sampling period, and a delay 2C for delaying the output of the bit limiter 1 for one sampling period. A shift register 3A is connected to the output of the line memory 2A to shift the output of the line memory 2A by one bit. Also, two shift registers 3B and 3C are connected in series to the output of the delay 2C to shift the output of delay 2C by two bits. In addition, three shift registers 3D through 3F are connected in series to the output of the bit limiter 1 to shift the output of bit limiter 1 by three bits.

The outputs of delay 2B and shift registers 3A, 3C and 3F are applied to an adder 4. The adder 4 adds the input signals and outputs a 4-bit signal to a frame memory 5 and a comparator 6. The frame memory 5 stores the 4-bit signal output from adder 4 according to an input pixel clock and a frame clock. The frame memory 5 outputs the 4-bit signal which was previously generated for the adjacent frame block to the comparator 6. The comparator 6 compares the output of the adder 4 with the previously stored signal output from the frame memory 5 and outputs a motion signal which represents whether the input video signals are in a moving area or a stationary area.

If an 8-bit input video signal $Y_{in}$ is input to the conventional circuit constructed above, the bit limiter 1 compares whether the input video signal $Y_{in}$ is larger or smaller than the decimal number 127. If the input video signal $Y_{in}$ is smaller than 127, the bit limiter 1 outputs a zero. If the input video signal $Y_{in}$ is larger than 127, the bit limiter 1 outputs a one. Thus, the 8-bit video signal is transformed into a one-bit signal that is applied to the line memory 2A, the delay 2C, and the shift register 3D.

Figure 2:
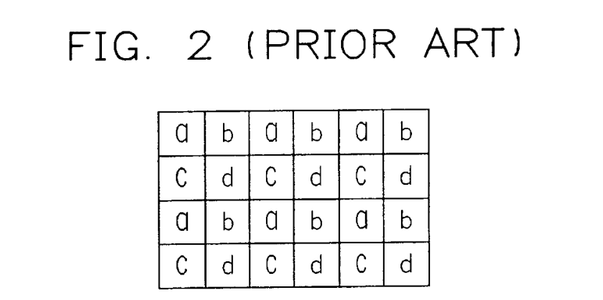
FIG. 2 shows a sample constitution which represents a unit of a conventional encoding.

FIG. 2 shows a sample constitution diagram which represents a conventional encoding technique. The sample composition diagram comprises a plurality of frame blocks. Each frame block is divided into a 2×2 block unit constituted by two horizontal pixels and two vertical pixels. The two upper horizontal pixels of each frame contain the samples a and b, and the two lower horizontal pixels of each frame contain the samples c and d.

Each 4-bit signal output by the adder 4 represents a 2×2 frame block as follows. First, the motion detecting circuit inputs an input video signal $Y_{in}$ representing a pixel in row x, column y (i.e. input video signal (x,y)). The bit limiter 1 then converts this input video signal (x,y) into a resultant one bit signal (i.e. one bit signal (x,y)), and the one bit signal (x,y) is stored in the line memory 2A. Second, the input video signal (x,y+1) is input, and the resultant one bit signal (x,y+1) is stored in the line memory 2A.

After the all of the input video signals $Y_{in}$ have been input for row x, the input video signals $Y_{in}$ for row x+1 are input. Eventually, the input video signal (x+1,y) is input, and the bit limiter 1 outputs the resultant one bit signal (x+1,y) to the delay 2C. At this time, the line memory 2A also outputs the one bit signal (x,y) to the delay 2B.

Subsequently, the input video signal (x+1,y+1) is converted into the one bit signal (x+1,y+1). This one bit signal (x+1,y+1) is output from the bit limiter 1 as sample d. At the same time the one bit signal (x+1,y+1) is output from the bit limiter 1, the delay 2C outputs the one bit signal (x+1,y) as sample c, the line memory 2A outputs the one bit signal (x,y+1) as sample b, and the delay 2B outputs the one bit signal (x,y) as sample a.

Then, sample d is shifted three times by shift registers 3D to 3F to form the four bit word d000. Sample c is shifted two times by shift registers 3B and 3C to form the four bit word 0c00. Sample b is shifted once by shift register 3A to form the four bit word 00b0. Finally, sample a is not shifted at all to form the word 000a. Subsequently, the these signals are input to the adder 4, and the adder 4 adds the signals to form the 4-bit codeword dcba. This 4-bit codeword can be expressed as $2^0a+2^1b+2^2c+2^3d$.

After the 4-bit codeword is formed, the 4-bit codeword is simultaneously stored in the frame memory 5 and output to the comparator 6. The comparator 6 compares the output current codeword output by the adder 4 with the previous code word output by the frame memory 5. The previous codeword refers to the last codeword that was generated during the sampling of the input video signals (x–2,y), (x–2,y+1), (x–1,y), (x–1,y+1). Depending on the relationship between the previous codeword and the current codeword, the comparator is able to determine if motion is detected. If motion is detected, the comparator 6 outputs a zero. If no motion is detected, the comparator 6 outputs a one.

As described above, the conventional circuit uses a signal which is converted into a one-bit signal to obtain a one-bit motion signal based on the frame difference. However, since the input video signal $Y_{in}$ is already converted into the one-bit signal before it is processed, accurately detecting motion is not possible even though four pixels on the field are used. In other words, since the 8-bit input video signal $Y_{in}$ is reduced to a one-bit signal or a signal with less than 8-bits, the chance of an error due to noise can be reduced. However, in such a conventional circuit, moving area processing is extremely limited as compared to a similar level of stationary area processing. Thus, the overall picture quality is degraded. As such, erroneously interpreting the moving area as the stationary area more severely degrades the picture quality than if the stationary area is erroneously interpreted as a motion picture domain.

For example, if the moving area is misinterpreted as the stationary area and the previous frame signal is used as an interpolation signal in case of being interlaced to progressive scan conversion, the interlined distance becomes irregular and degrades the picture quality. Furthermore, the more severe the motion, the more the picture is degraded. However, when the stationary area is interpreted as the moving area, intra-field processing is performed. Therefore, the vertical resolution of a picture is reduced but the misinterpretation does not severely degrade the picture quality.

In FIG. 1, although the motion detection is performed according to four horizontal-vertical samples and an output signal is processed using a 5-point median filter at the next stage (not shown), the above problem persists until the length of the bits is increased since the above problem is due to the small length of bits representing the interframe difference. However, when the length of the bits is increased, the hardware cannot be simplified because the capacity of the frame memory must be increased.

SUMMARY OF THE INVENTION

Therefore, to solve the above problems, it is an object of the present invention to provide a motion detection method which uses spatial correlation information capable of effectively reducing errors without significantly increasing the amount of hardware. Furthermore, the method obtains spatial correlation information having an excellent motion detection performance when processing a signal in a spatial domain. Then the obtained spatial correlation information is compared the spatial correlation information with a previous frame to accurately detect motion.

Another object of the present invention is to provide an apparatus embodying the above method.

Thus, to accomplish one object of the present invention, there is provided a motion detection method using spatial information, comprising the steps of:

receiving input signal and creating delayed input signals by delaying said input signal, wherein said delayed input signal is transformed into samples necessary for extracting spatial correlation information; obtaining a subtraction value between peripheral pixels using said samples, comparing said subtraction value with a predetermined reference value, and extracting spatial correlation information corresponding to bits which represent said pixels; and comparing current spatial correlation information with previous frame spatial correlation information and determining whether said input signals are in a moving area or a stationary area.

Another object of the present invention is accomplished by providing a motion detection circuit using spatial information comprising:

a memory portion for receiving input signals creating delayed input signals by delaying said input signals, wherein said delayed input signal are transformed into samples necessary for extracting spatial correlation information; a spatial information extraction and encoding portion for obtaining a subtraction value between peripheral pixels using said samples output from said memory portion, comparing said subtraction value with a predetermined reference value, and detecting a degree of correlation in various directions of a frame; a frame memory for storing spatial correlation information output from said spatial information extraction and encoding portion; and a comparator portion for comparing an output signal of the spatial information extraction and encoding portion with a previous frame spatial correlation information output from said frame memory and outputting a motion signal which represents whether said input signals are in a moving area or a stationary area.

DETAILED DESCRIPTION OF THE PREFERRED EMBODIMENT

The preferred embodiments of the present invention will be described below in more detail with reference to FIGS. 3 through 7.

Figure 3:
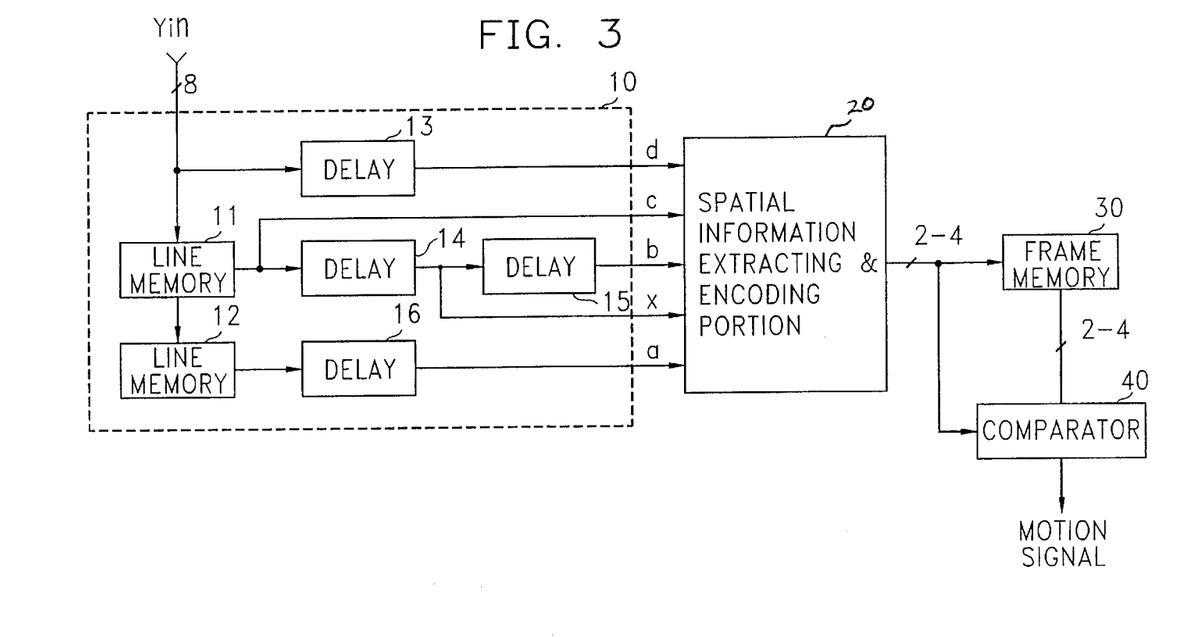
FIG. 3 is a block diagram of a motion detection circuit using spatial information according to a preferred embodiment of the present invention.

FIG. 3 shows an embodiment of a motion detection circuit using spatial information according to the present invention. In the embodiment, a memory portion 10 delays the 8-bit input video signal $Y_{in}$ and transforms the delayed signal into samples which are used for generating spatial correlation information. The memory portion 10 includes two line memories 11 and 12 and four delays 13 to 16.

The samples output from memory portion 10 are applied to a spatial information extracting and encoding portion 20. The spatial information extracting and encoding portion 20 obtains subtraction values between adjacent pixels in a frame using the input samples, compares the subtraction values with a predetermined reference value to detect a degree of spatial correlation in various directions within a frame, and then encodes the degree of spatial correlation into bits which represents the spatial correlation information. The spatial information extracting and encoding portion 20 outputs the encoded spatial correlation information to a frame memory 30 and a comparator 40.

The comparator 40 inputs the current spatial correlation information from spatial information extracting and encoding portion 20 and inputs the previous spatial correlation information which was stored in the frame memory 30. The comparator 40 compares the current spatial correlation information with the previous spatial correlation information and generates a motion signal. The motion signal represents whether the input video signal $Y_{in}$ is in a moving area or a stationary area.

When an 8-bit video signal $Y_{in}$ is input to a motion detection circuit as constructed above, the memory portion 10 delays the input video signal $Y_{in}$ and then transforms the delayed signal into samples a, b, c, d, and x which are used to determine the spatial correlation information.

Figure 4:
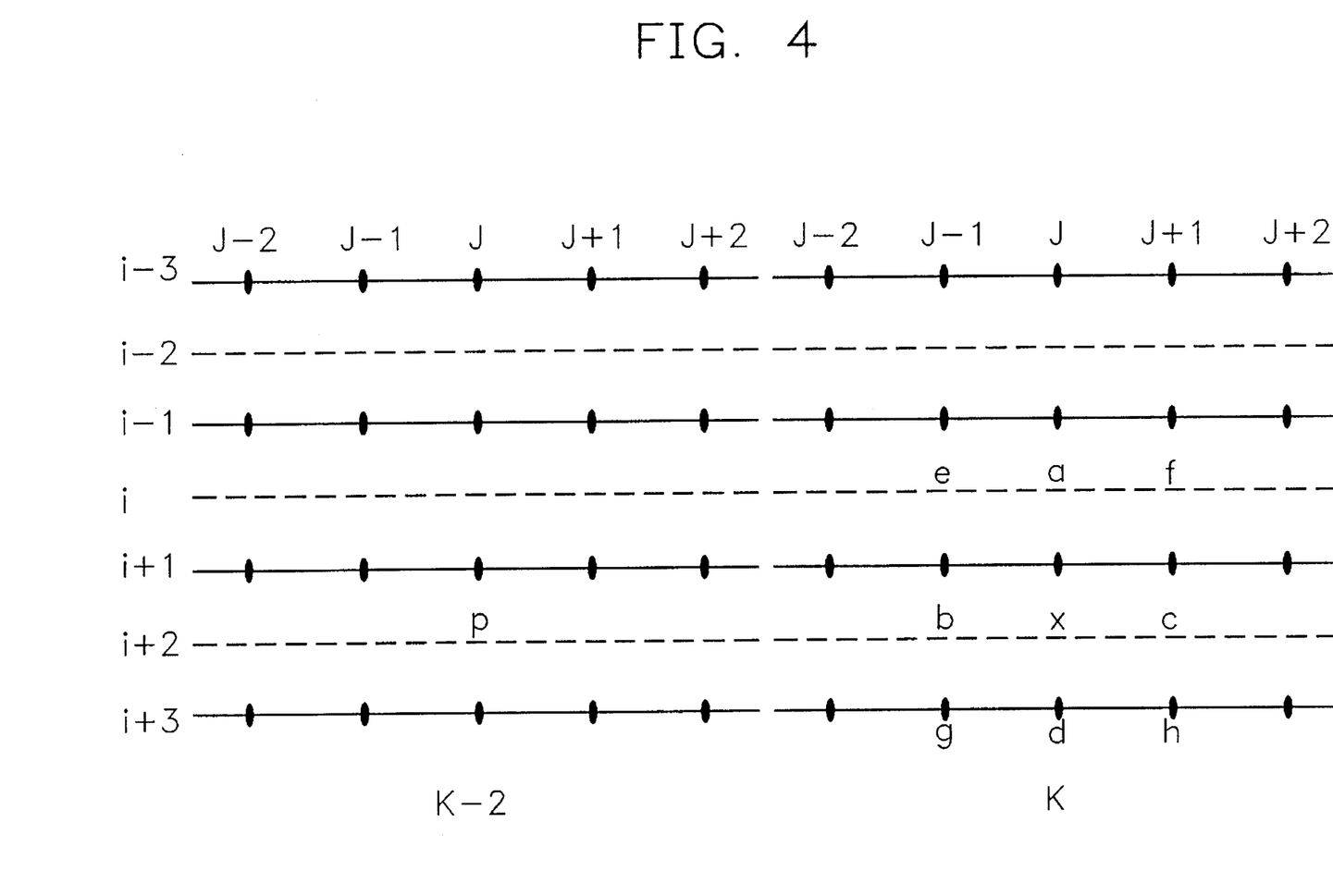
FIG. 4 shows a sample position necessary for extracting spatial correlation information according to the present invention.

FIG. 4 shows an example of positions of the samples used for generating the spatial correlation information. In FIG. 4, a reference character i represents the row number of a row of pixels, a reference character j represents a j-th pixel of a row, a reference character K represents the number of a frame, and a reference character p represents a previous frame pixel. In FIG. 3, two line memories 11 and 12 and four delays 13 to 16 transform the input video signals into the samples a, b, c, d, and x into the pattern shown in FIG. 4 as follows. (The samples e, f, g, and h in FIG. 4 are generated by another embodiment described later).

First, the motion detection circuit inputs an input video signal $Y_{in}$ representing a pixel in row i, column j (i.e. input video signal (i,j)), and the input video signal (i, j) is input to line memory 11. After the all of the input video signals $Y_{in}$ have been input for row i, the input video signals $Y_{in}$ for row i+1 are input.

Eventually, the input video signal (i+1,j−1) is input and stored in the line memory 11. Subsequently, the input video signal (i+1,j) is input and stored in the line memory 11. At this time, the input video signal (i,j) stored in the line memory 11 is output from the line memory 11 and input to the line memory 12. Next, the input video signal (i+1,j+1) is input and stored in line memory 11. After the all of the input video signals $Y_{in}$ have been input for row i+1, the input video signals $Y_{in}$ for row i+2 are input.

Eventually, the input video signal (i+2,j−1) is input and stored in the line memory 11. At this time, the input video signal (i+1,j−1) stored in the line memory 11 is output from the line memory 11 and input to the delay 14. Subsequently, the input video signal (i+2,j) is input to the delay 13. At this time, the input video signal (i+1,j−1) is output from the delay 14 and input to the delay 15, the input video signal (i+1,j) is output from the line memory 11 and input to the delay 14, and the input video signal (i,j) is output from the line memory 12 and output to the delay 16.

When the input video signal (i+2,j+1) is input by the memory circuit 10, the input video signal (i,j) is output from the delay 16 as sample a, the input video signal (i+1,j−1) is output of the delay 15 as sample b, the input video signal (i+1,j+1) is output from the line memory 11 as sample c, the input video signal (i+2,j) is output from the delay 13 as sample d, and the input video signal (i+1,j) is output from the delay 14 as sample x. After the samples a, b, c, d, and x have been output, they are input by the spatial information extracting and encoding portion 20.

The spatial information extracting and encoding portion 20 obtains subtraction values using the samples a, b, c, d, and x, compares the subtraction values with predetermined reference values, detects a degree of spatial correlation in various directions in the frame, and then encodes the degree of spatial correlation into bits which represent the spatial correlation information. There are three methods for obtaining horizontal and vertical spatial correlation information as follows.

The first method obtains 2-bit spatial correlation information (i.e., m0, m1) as follows. An absolute value of a subtraction value between samples a and d is obtained and the absolute value is compared with a reference value th1. If the absolute value is smaller than the reference value th1, a zero is output as m0. If the absolute value is larger than the reference value th1, a one is output as m0. Also, an absolute value of a subtraction value between samples c and b is obtained and the absolute value is compared with a reference value th2. If the absolute value is smaller than the reference value th2, a zero is output as m1. If the absolute value is larger than the reference value th2, a one is output as m1. In other words:

in case of |a−d|<th1, m0=0, in case of |a−d|≧th1, m0=1, in case of |c−b|<th2, m1=0, and in case of |c−b|≧th2, m1=1.

The second method is a combination of the first method and the conventional one-bit motion detection method. In this case, 3-bit spatial correlation information (i.e., m0, m1, m2) is obtained, and the spatial is correlation information is added to the information on the frame. Afterwards, a degree of correlation on a time basis is determined.

The above procedure is implemented as follows. An absolute value of a subtraction value between samples a and d is obtained and the absolute value is compared with the reference value th1. If the absolute value is smaller than the reference value th1, a zero is output as m0. If the absolute value is larger than the reference value th1, a one is output as m0. Likewise, an absolute value of a subtraction value between samples c and b is obtained and the absolute value is compared with the reference value th2. If the absolute value is smaller than the reference value th2, a zero is output as m1. If the absolute value is larger than the reference value th2, a zero is output as m1. Also, the sample x is compared with a reference value th3. If the sample x is larger than the reference value th3, a one is output as m2. If the sample x is smaller than the reference value th3, a zero is output as m2. In other words:

in case of |a−d|<th1, m0=0, in case of |a−d|th1, m0=1, in case of |c−b|<th2, m1=0, in case of |c−b|≧th2, m1=1, in case of x> th3, m2=1, and in case of x≦th3, m2=0.

The third method obtains correlation information due to a subtraction value between a center pixel (sample x) and adjacent pixels. In this case, four-bit spatial correlation information (m0, m1, m2, m3) can be obtained as follows. An absolute value of a subtraction value between samples a and x is obtained and the absolute value is compared with a reference value th1. If the absolute value is smaller than the reference value th1, a zero is output as m0. If the absolute value is larger than the reference value th1, a one is output as m0. Likewise, an absolute value of a subtraction value between samples b and x is obtained and the absolute value is compared with a reference value th2. If the absolute value is smaller than the reference value th2, a zero is output as m1. If the absolute value is larger than the reference value th2, a one is output as m1. Also, an absolute value of a subtraction value between samples c and x is obtained and the absolute value is compared with a reference value th2. If the absolute value is smaller than the reference value th2, a zero is output as m2. If the absolute value is larger than the reference value th2, a one is output as m2. Similarly, an absolute value of a subtraction value between samples d and x is obtained and the absolute value is compared with a reference value th1. If the absolute value is smaller than the reference value th1, a zero is output as m3. If the absolute value is larger than the reference value th1, a one is output as m3. In other words:

in case of $|a-x|<th1$, $m0=0$, in case of $|a-x|\geq th1$, $m0=1$, in case of $|b-x|<th2$, $m1=0$, in case of $|b-x|\geq th2$, $m1=1$, in case of $|c-x|<th2$, $m2=0$, in case of $|c-x|<th2$, $m2=1$, in case of $|d-x|<th1$, $m3=0$, and in case of $|d-x|\leq th1$, $m3=1$.

The spatial information extracting and encoding portion 20 selects one of the three methods as described above to extract the spatial correlation information. Any one of the three methods may be implemented by software, hardware, or a combination of both.

Figure 5:
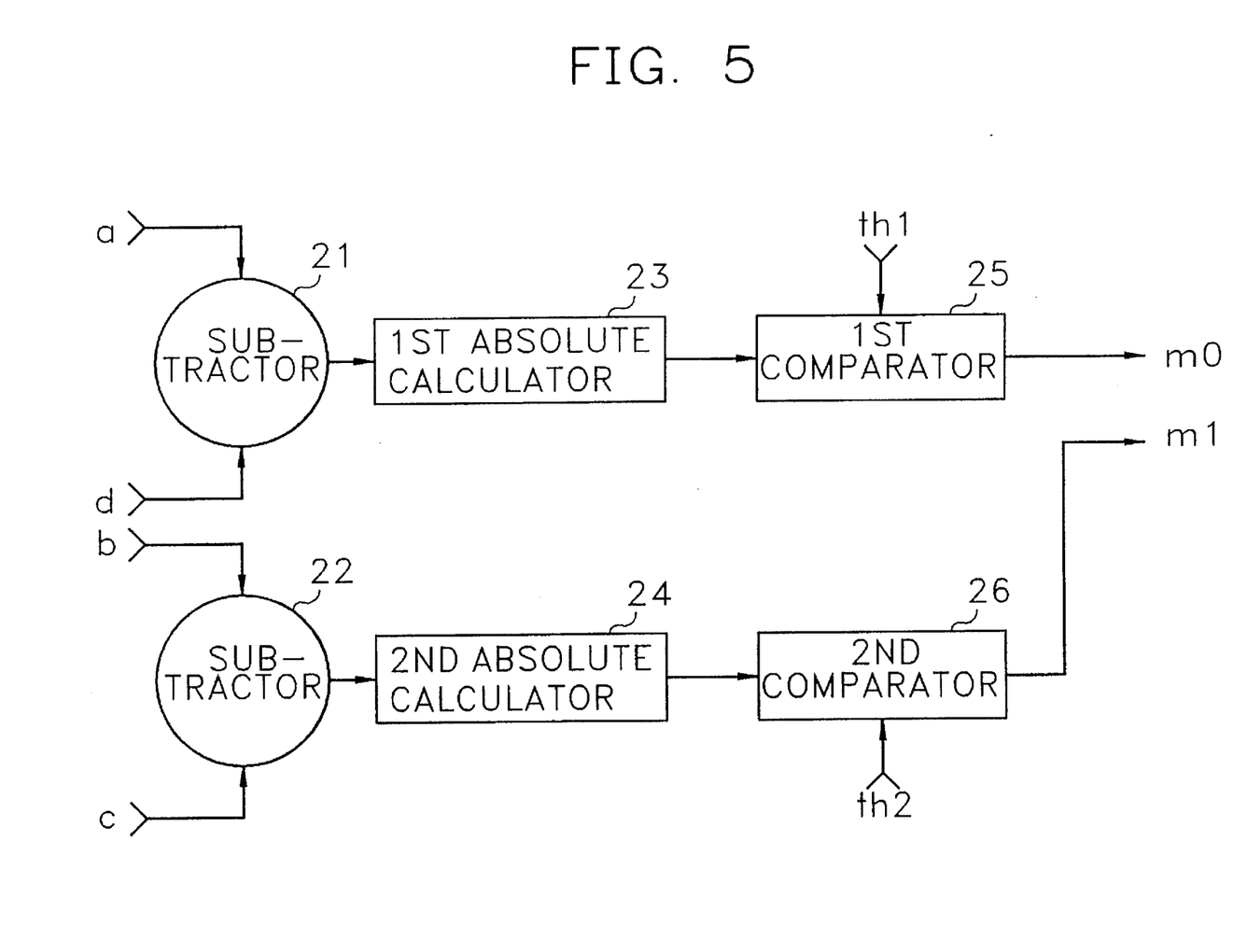
FIG. 5 is a block diagram showing a detailed construction of a spatial information extracting and encoding portion in FIG. 3.

FIG. 5 is a block diagram showing a detailed construction of a spatial information extracting and encoding portion 20 which utilizes the first method. As shown in FIG. 5, the spatial information extracting and encoding portion 20 includes a first subtractor 21 for subtracting samples a and d, and a second subtractor 22 for subtracting samples b and c. A first absolute calculator 23 and a second absolute Calculator 24 are connected to the outputs of the first and second subtractors 21 and 22, respectively. As a result, the absolute values of the subtracted values are obtained. The output of first absolute calculator 23 is applied to a first comparator 25, and the first comparator 25 compares the input signal with the predetermined reference value th1 to generate a 1-bit spatial correlation signal m0. Also, the output of second absolute calculator 24 is applied to a second comparator 26. The second comparator 26 compares the input signal with the predetermined $t_0$ reference value th2 to generate a 1-bit spatial correlation signal m1. The 1-bit spatial correlation signal m0 and the 1-bit spatial correlation signal m1 form the 2-bit spatial correlation information m0, m1. The other circuit constructions according to the remaining two methods can be accomplished in a similar manner.

Figure 6:
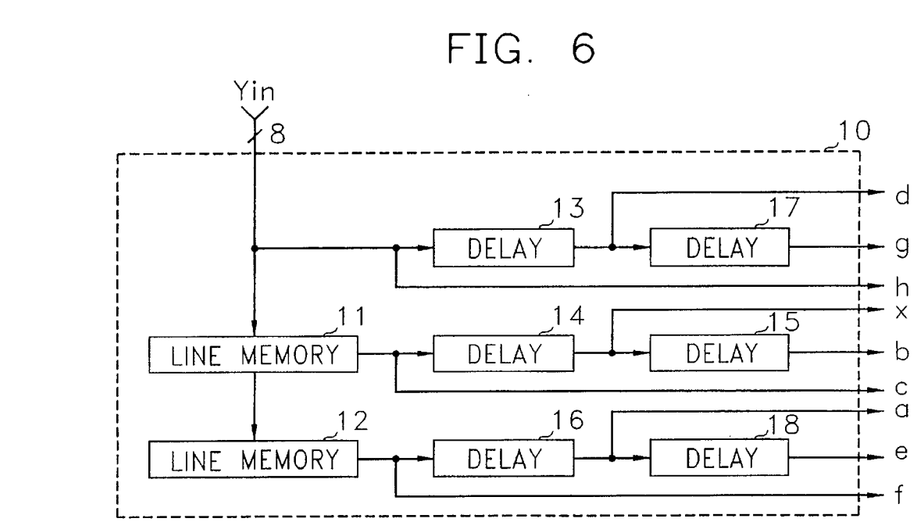
FIG. 6 is a block diagram of another embodiment of a memory portion in FIG. 3.

FIG. 6 shows another embodiment of the memory portion 10 in FIG. 3. The memory detection circuit of this embodiment is able to obtain spatial correlation information which takes into account diagonal components of motion within a frame. As shown in FIG. 6, the memory portion 10 includes two line memories 11 and 12 and six delays 13 to 18 which respectively transform the input video signals (i,j), (i+1,j−1), (i+1,j+1), (i+2,j), (i,j−1), (i,j+1), (i+2,j−1), (i+2,j+1), (i+1,j) into the samples a, b, c, d, e, f, g, h, and x. As a result, the samples a, b, c, d, e, f, g, h, and x represent the frame shown in FIG. 4.

The sample a, b, c, d, e, f, g, h, and x are created as follows. In this embodiment, the 8-bit input video signal (i+2,j+1) is input to the memory portion 10 and is applied directly to the spatial information extracting and encoding portion 20 as sample h. Also, the input video signal (i+2,j) is delayed for one sampling period by the delay 13 and is applied to the spatial information extracting and encoding portion 20 as sample d. Similarly, the input video signal (i+2,j−1) is delayed for an additional sampling period by delay 17 and is applied to the spatial information extracting and encoding portion 20 as sample g.

The 8-bit video signals (i+1,j−1), (i+1,j), (i+1,j+1) are delayed for one line period by the line memory 11. The input video signal (i+1,j+1) is output from the line memory 11 and applied to spatial information extracting and encoding portion 20 as sample c. The input video signal (i+1,j) is delayed for a sampling period by the delay 14 and is applied to the spatial information extracting and encoding portion 20 as sample x. Also, the input video signal (i+1,j−1) is delayed for an additional sampling period by the delay 15 and is applied to the spatial information extracting and encoding portion 20 as sample b.

In addition, the input video signals (i,j−1), (i,j), (i,j+1) are delayed for two line periods by the line memory 11 and the line memory 12. The input video signal (i,j+1) is output from the line memory 12 and is applied to the spatial information extracting and encoding portion 20 as sample f. The input video signal (i,j) is delayed for a sampling period by the delay 16 and is applied to the spatial information extracting and encoding portion 20 as sample a. Furthermore, the input video signal (i,j−1) is delayed an additional sampling period by the delay 18 and is applied to the spatial information extracting and encoding portion 20 as sample e.

The spatial information extracting and encoding portion 20 uses the sample signals input from the memory portion 10 of FIG. 6 and obtains a 4-bit spatial correlation information (m1, m2, m3, m4).

To calculate the spatial correlation information, an absolute value of a subtraction value of samples a and d is obtained and is compared with a reference value th1. If the absolute value is smaller than reference value th1, a zero is output as m0. If the absolute value is larger than reference value th1, a one is output as m0. Likewise, a subtraction value of samples b and c, a subtraction value of samples e and h, and a subtraction value of samples f and g are obtained. Then the obtained subtraction values are compared with reference values th2, th3, and th3, respectively. If an absolute value is smaller than a reference value, a value of zero is output. If not, a value of one is output. In other words:

in case of $|a-d|<th1$, $m0=0$, in case of $|a-d|\geq th1$, $m0=1$, in case of $|c-b|<th2$, $m1=0$, in case of $|b-c|\geq th2$, $m1=1$, in case of $|e-h|<th3$, $m2=0$, in case of $|e-h|\geq th3$, $m2=1$, in case of $|f-g|<th3$, $m3=0$, and in case of $|f-g|\geq th3$, $m3=1$.

The reference values th1 through th3 can be different from each other according to the motion characteristics between the various orientations of pixels within a frame. However, in most cases, the values th1 through th3 are identical. Furthermore, the reference values can be different values in order to account for noise.

The 2 to 4 bit spatial correlation information signal output from spatial information extracting and encoding portion 20 is simultaneously stored in a frame memory 30 and output to a comparator 40. In this embodiment, the frame memory 30 is constructed so that it inputs only 2 to 4 bits. However, to increase accuracy, the frame memory 30 can be modified to input 8 bits.

The comparator 40 compares the spatial correlation information of the current frame output from the spatial information extracting and encoding portion 20 with the spatial correlation information of the previous frame output from the frame memory 30. In case of a moving area, the comparator 40 outputs a zero, while in case of a stationary area, the comparator 40 outputs a one. As in the aforementioned third method, when multiple-bit spatial correlation information is used, soft-switch processing can be performed according to how many bits have the same values, instead of performing a hard-switch one-bit motion detection according to a simple identification.

Figure 7:
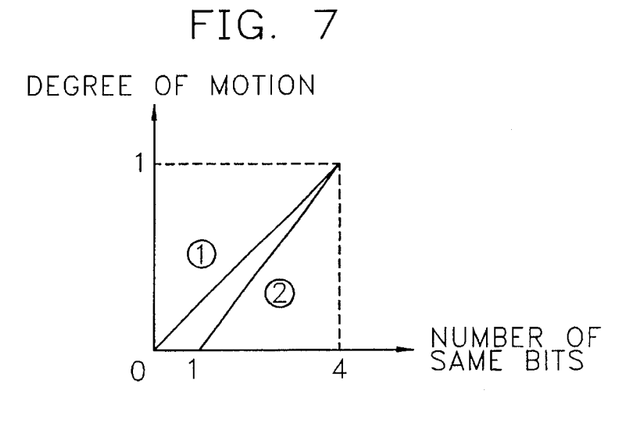
FIG. 7 is a characteristic graph for a soft-switch processing in a comparator portion of FIG. 3.

FIG. 7 is a graph showing a characteristic of soft-switch processing in the comparator 40 of FIG. 3. In FIG. 7, a degree of motion detection is based on the number of corresponding bits of the present frame and those of the previous frame which have the same value. This degree of motion detection is represented as two characteristic lines (1) and (2). Line (1) represents the estimation of a degree of motion detection by proportionally changing an amount of motion according to the number of corresponding bits which are the same. Line (2) represents an estimation in which there is no motion until the number of the corresponding bits have the same value becomes one. Also, a number 1 on the vertical axis represents a motion image and a number 0 on the vertical axis represents a still image. The comparator 40 can use the characteristics illustrated in FIG. 7 to create predetermined reference values for motion detection. Thus, the comparator 40 can detect motion when the reference value is exceeded and can also detect that there is no motion until the number of corresponding bits having the same value becomes one.

As described above, the present invention obtains the spatial correlation information in various directions of a field and compares the spatial correlation information of the current frame with the corresponding spatial correlation information of the previous frame. Thus, the present invention can accurately detect the motion, remove the degradation of a picture quality, and reduce the amount of hardware. In addition, the various equations by which the spatial information extracting and encoding portion 20 determines the various spatial correlation information m0, m1, m2, and/or m3 are not limited to the particular equations described above. For instance, as previously mentioned, the spatial information extracting and encoding portion 20 of the first embodiment may use the following equations to obtain the spatial correlation information m0 and m1 according to the first method:

in case of $|a-d|<th1$, m0=0, in case of $|a-d|\geq th1$, m0=1, in case of $|c-b|<th2$, m1=0, and in case of $|c-b|\geq th2$, m1=1.

However, the first method is not necessarily limited to the exact equations above. For instance, the spatial correlation value m0 may equal "1" if $|a-d|<th1$ and may equal "0" if $|a-d|\geq th1$. Alternatively, the spatial correlation value m0 may equal "0" if $|a-d|>th1$ and may equal "1" if $|a-d|\leq th1$.

Similarly, as described previously, the spatial information extracting and encoding portion 20 of the first embodiment may use the following equations to obtain the spatial correlation information m0, m1, and m2 according to the second method:

in case of $|a-d|<th1$, m0=0, in case of $|a-d|\geq th1$, m0=1, in case of $|c-b|<th2$, m1=0, in case of $|c-b|\geq th2$, m1=1, in case of $x>th3$, m2=1, and in case of $x\geq th3$, m2=0.

However, the second method is not necessarily limited to the exact equations above, and the spatial correlation information m0, m1, and m2 may be determined according to various other similar sets of equations, such as:

in case of $|a-d|<th1$, m0=0, in case of $|a-d|\geq th1$, m0=1, in case of $|c-b|<th2$, m1=0, in case of $|c-b|\geq th2$, m1=1, in case of $x<th3$, m2=1, and in case of $x\geq th3$, m2=0.

In addition, even though some of the specific embodiments above disclose using the same predetermined reference values to determine two different spatial correlation information, the present invention is not limited to such embodiments and may use a different predetermined reference value to determine each spatial correlation information. For example, the spatial information extracting and encoding portion 20 may determine the spatial correlation information based on the following equations:

in case of $|a-d|<th1$, m0=0, in case of $|a-d|\geq th1$, m0=1, in case of $|b-c|<th2$, m1=0, in case of $|b-c|\geq th2$, m1=1, in case of $|e-h|<th3$, m2=0, in case of $|e-h|\geq th3$, m2=1, in case of $|f-g|<th4$, m3=0, and in case of $|f-g|\geq th4$, m3=1.

Furthermore, an additional spatial correlation information m4 may be added to the four spatial correlation information m0, m1, m2, and m3 above by comparing the sample x with a fifth predetermined reference value as follows:

in case of $x<th5$, m4=1, in case of $x\geq th5$, m4=0.

As shown above, the various equations described throughout the specification for determining the various spatial correlation information m0, m1, m2, m3, and/or m4 may be modified in many different manners based on the particular application of the present invention.

What is claimed is:

1. A motion detection circuit using spatial information comprising:

a memory portion for receiving input signals and creating delayed input signals by delaying said input signals, wherein said delayed input signals are transformed into samples necessary for extracting spatial correlation information;

a spatial information extraction and encoding portion for obtaining a subtraction value between peripheral pixels of a frame using said samples output from said memory portion, comparing said subtraction value with at least one predetermined reference value, and generating spatial correlation information;

a frame memory for storing said spatial correlation information output from said spatial information extraction and encoding portion; and a comparator portion for comparing current spatial correlation information output from the spatial information extraction and encoding portion with a previous spatial correlation information output from said frame memory and for outputting a motion signal, based on said comparison, which represents whether said input signals are in a moving area or a stationary area.

2. A motion detection circuit according to claim 1, wherein said memory portion comprises:

a first delay for delaying a first input signal of said input signals for one-sample period and transforming said first input signal into a sample d;

a first line memory for delaying a second input signal of said input signals for one-line period and transforming said second input signal into a sample c;

a second delay for delaying a first signal output from said first line memory for one-sample period and transforming said first signal output from said first line memory into a sample x;

a third delay for delaying a signal output from said second delay for one-sample period and transforming said signal output from said second delay into a sample b;

a second line memory for delaying a second signal output from said first line memory for a one-line period and transforming said second signal output from said first line memory into an intermediate signal; and a fourth delay for delaying said intermediate signal for one-sample period and transforming said intermediate signal into a sample a.

3. A motion detection circuit according to claim 2, wherein said memory portion further comprises:

a fifth delay for delaying a signal output from said first delay for one-sample period and transforming said signal output from said first delay into a sample g; and a sixth delay for delaying a signal output from said fourth delay for one-sample period and transforming said signal output from said fourth delay into a sample e.

4. A motion detection circuit according to claim 1, wherein said spatial information extracting and encoding portion comprises:

a first subtractor for determining a difference between samples a and d which are output from said memory portion;

a second subtractor for determining a difference between samples b and c which are output from said memory portion;

a first absolute calculator for obtaining an absolute value of an output of said first subtractor;

a second absolute calculator for obtaining an absolute value of an output of said second subtractor;

a first comparator for comparing an output of said first absolute calculator with a first predetermined reference value to generate a first spatial correlation information; and a second comparator for comparing an output of said second absolute calculator with a second predetermined reference value to generate a second spatial correlation information.

5. A motion detection circuit according to claim 2, wherein said spatial information extracting and encoding portion comprises:

a first subtractor for determining a difference between said samples a and d which are output from said memory portion;

a second subtractor for determining a difference between said samples b and c which are output from said memory portion;

a first absolute calculator for obtaining an absolute value of an output of said first subtractor;

a second absolute calculator for obtaining an absolute value of an output of said second subtractor;

a first comparator for comparing an output of said first absolute calculator with a first predetermined reference value to generate a first spatial correlation information; and a second comparator for comparing an output of said second absolute calculator with a second predetermined reference value to generate a second spatial correlation information.

6. A motion detection circuit according to claim 3, wherein said spatial information extracting and encoding portion comprises:

a first subtractor for determining a difference between said samples a and d which are output from said memory portion;

a second subtractor for determining a difference between said samples b and c which are output from said memory portion;

a first absolute calculator for obtaining an absolute value of an output of said first subtractor;

a second absolute calculator for obtaining an absolute value of an output of said second subtractor;

a first comparator for comparing an output of said first absolute calculator with a first predetermined reference value to generate a first spatial correlation information; and a second comparator for comparing an output of said second absolute calculator with a second predetermined reference value to generate a second spatial correlation information.

7. A motion detection circuit according to claim 1, wherein said comparator portion checks how many bits of said samples have the same value and estimates a motion value which is proportional to the number of said bits which have the same value.

8. A motion detection circuit according to claim 7, wherein said comparator portion estimates that no motion exists until the number of said bits having the same value becomes a predetermined number and wherein said comparator portion estimates said motion value which is proportional to the number of said bits which have the same value when the number of said bits equals or is larger than said predetermined number.

9. A motion detection method using spatial information, comprising the steps of:

receiving input signals and creating delayed input signals by delaying said input signals, wherein said delayed input signals are transformed into samples necessary for extracting spatial correlation information;

obtaining a subtraction value between peripheral pixels of a frame using said samples, comparing said subtraction value with at least one predetermined reference value, and generating spatial correlation information; and comparing current spatial correlation information with previous spatial correlation information and determining whether said input signals are in a moving area or a stationary area based on said comparison.

10. A motion detection method according to claim 9, wherein said step of generating spatial correlation information obtains a first spatial correlation information and a second spatial correlation information according to the following equations:

in case of $|a-d|<th1$, $m0=0$; in case of $|a-d|\geq th1$, $m0=1$;

in case of $|c-b|<th2$, $m1=0$; and in case of $|c-b|\geq th2$, $m1=1$;

wherein said a, b, c and d are four of said samples, said th1 is a first predetermined reference value according to at least one of a direction characteristic and noise, said th2 is a second predetermined reference value according to at least one of a direction characteristic and noise, and said m0 and m1 are said first and second spatial correlation information, respectively.

11. A motion detection method according to claim 10, wherein said step of generating spatial correlation information further comprises the step of:

obtaining a third spatial correlation information according to the following equations:

in case of $x\geq th3$, $m2=1$; and in case of $x\leq th3$, $m2=0$, wherein said x represents an additional sample of said samples, said th3 is a third predetermined reference value, and said m2 is said third spatial correlation information.

12. A motion detection method according to claim 10, wherein said step of generating spatial correlation information further comprises the step of:

obtaining a third spatial correlation information and a fourth spatial correlation information according to the following equations:

in case of $|e-h|<th3$, $m2=0$; in case of $|e-h| \geq th3$, $m2=1$;
in case of $|f-g|<th4$, $m3=0$; and in case of $|f-g| \geq th4$, $m3=1$;

wherein said e, f, g and h are four additional samples of said samples, said th3 is a third predetermined reference value, said th4 is a fourth predetermined reference value, and said m2 and m3 are said third and fourth spatial correlation information, respectively.

13. A motion detection method according to claim 9, wherein said step of generating spatial correlation information further comprises the step of:

obtaining first, second, third, and fourth spatial correlation information using a difference signal between a center pixel and said peripheral pixels obtained according to the following equations:

in case of $|a-x|<th1$, $m0=0$; in case of $|a-x| \geq th1$, $m0=1$;
in case of $|b-x|<th2$, $m1=0$; in case of $|b-x| \geq th2$, $m1=1$;
in case of $|c-x|<th3$, $m2=0$; in case of $|c-x| \geq th3$, $m2=1$;
in case of $|d-x|<th4$, $m3=0$; and in case of $|d-x| \geq th4$, $m3=1$;

wherein said a, b, c, d, and x are five samples of said samples, said th1 is a first predetermined reference value set according to at least one of a direction characteristic and noise, said th2 is a second predetermined reference value set according to at least one of a direction characteristic and noise, said th3 is a third predetermined reference value set according to at least one of a direction characteristic and noise, said th4 is a fourth predetermined reference value set according to at least one of a direction characteristic and noise, and said m0, m1, m2, and m3 are said first, second, third, and fourth spatial correlation information, respectively.

14. A motion detection method according to claim 13, wherein said step of generating spatial correlation information further comprises the step of:

obtaining a fifth spatial correlation information according to the following equationa;

in case of $x \geq th5$, $m4=1$; and
in case of $x \geq th5$, $m4=0$, wherein said th5 is a fifth predetermined reference value and said m4 is said fifth spatial correlation information.

15. A motion detection circuit according to claim 4, wherein said spatial information extracting and encoding portion comprises:

a third comparator for comparing a sample x which is output from said memory portion with a third predetermined reference value to generate a third spatial correlation information.

16. A motion detection circuit according to claim 5, wherein said spatial information extracting and encoding portion comprises:

a third comparator for comparing said sample x which is output from said memory portion with a third predetermined reference value to generate a third spatial correlation information.

17. A motion detection circuit according to claim 6, wherein said spatial information extracting and encoding portion comprises:

a third subtractor for determining a difference between said sample e and a sample h which are output from said memory portion, wherein said sample h is a third input signal of said input signals which is not delayed by said memory portion;

a fourth subtractor for determining a difference between a sample f and said sample g which are output from said memory portion, wherein said sample f is output from said second line memory when said sample a is output from said fourth delay;

a third absolute calculator for obtaining an absolute value of an output of said third subtractor:

a fourth absolute calculator for obtaining an absolute value of an output of said fourth subtractor;

a third comparator for comparing an output of said third absolute calculator with a third predetermined reference value to generate a third spatial correlation information; and a fourth comparator for comparing an output of said fourth absolute calculator with a fourth predetermined reference value to generate a fourth spatial correlation information.

18. A motion detection circuit according to claim 17, wherein said first, second, third, and fourth predetermined reference values are equal values.

19. A motion detection circuit according to claim 4, wherein said spatial information extracting and encoding portion comprises:

a third subtractor for determining a difference between samples e and h which are output from said memory portion;

a fourth subtractor for determining a difference between samples f and g which are output from said memory portion;

a third absolute calculator for obtaining an absolute value of an output of said third subtractor:

a fourth absolute calculator for obtaining an absolute value of an output of said fourth subtractor;

a third comparator for comparing an output of said third absolute calculator with a third predetermined reference value to generate a third spatial correlation information; and a fourth comparator for comparing an output of said fourth absolute calculator with a fourth predetermined reference value to generate a fourth spatial correlation information.

20. A motion detection circuit according to claim 19, wherein said first, second, third, and fourth predetermined reference values are equal values.

21. A motion detection circuit according to claim 2, wherein said spatial information extracting and encoding portion comprises:

a third subtractor for determining a difference between samples e and h which are output from said memory portion;

a fourth subtractor for determining a difference between samples f and g which are output from said memory portion;

a third absolute calculator for obtaining an absolute value of an output of said third subtractor;

a fourth absolute calculator for obtaining an absolute value of an output of said fourth subtractor;

a third comparator for comparing an output of said third absolute calculator with a third predetermined reference value to generate a third spatial correlation information; and a fourth comparator for comparing an output of said fourth absolute calculator with a fourth predetermined reference value to generate a fourth spatial correlation information.

22. A motion detection method according to claim 10, wherein said step of generating spatial correlation information further comprises the step of:

obtaining a third spatial correlation information according to the following equations:

in case of x<th3, m2=1; and in case of x≧th3, m2=0, wherein said x represents an additional sample of said samples, said th3 is a third predetermined reference value, and said m2 is said third spatial correlation information.

23. A motion detection circuit according to claim 1, wherein said spatial information extracting and encoding portion comprises:

a first subtractor for determining a difference between a sample a and a sample x which are output from said memory portion;

a second subtractor for determining a difference between a sample b and said sample x which are output from said memory portion;

a first absolute calculator for obtaining an absolute value of an output of said first subtractor;

a second absolute calculator for obtaining an absolute value of an output of said second subtractor;

a first comparator for comparing an output of said first absolute calculator with a first predetermined reference value to generate a first spatial correlation information; and a second comparator for comparing an output of said second absolute calculator with a second predetermined reference value to generate a second spatial correlation information.

24. A motion detection circuit according to claim 23, wherein said spatial information extracting and encoding portion comprises:

a third subtractor for determining a difference between a sample c and said sample x which are output from said memory portion;

a fourth subtractor for determining a difference between a sample d and said sample x which are output from said memory portion;

a third absolute calculator for obtaining an absolute value of an output of said third subtractor;

a fourth absolute calculator for obtaining an absolute value of an output of said fourth subtractor;

a third comparator for comparing an output of said third absolute calculator with a third predetermined reference value to generate a third spatial correlation information; and a fourth comparator for comparing an output of said fourth absolute calculator with a fourth predetermined reference value to generate a fourth spatial correlation information.

25. A motion detection circuit according to claim 2, wherein said spatial information extracting and encoding portion comprises:

a first subtractor for determining a difference between said samples a and x which are output from said memory portion;

a second subtractor for determining a difference between said samples b and x which are output from said memory portion;

a first absolute calculator for obtaining an absolute value of an output of said first subtractor;

a second absolute calculator for obtaining an absolute value of an output of said second subtracter;

a first comparator for comparing an output of said first absolute calculator with a first predetermined reference value to generate a first spatial correlation information; and a second comparator for comparing an output of said second absolute calculator with a second predetermined reference value to generate a second spatial correlation information.

26. A motion detection circuit according to claim 25, wherein said spatial information extracting and encoding portion comprises:

a third subtractor for determining a difference between said samples c and x which are output from said memory portion;

a fourth subtractor for determining a difference between said samples d and x which are output from said memory portion;

a third absolute calculator for obtaining an absolute value of an output of said third subtractor;

a fourth absolute calculator for obtaining an absolute value of an output of said fourth subtractor;

a third comparator for comparing an output of said third absolute calculator with a third predetermined reference value to generate a third spatial correlation information; and a fourth comparator for comparing an output of said fourth absolute calculator with a fourth predetermined reference value to generate a fourth spatial correlation information.

* * * * *